Patented Aug. 6, 1940

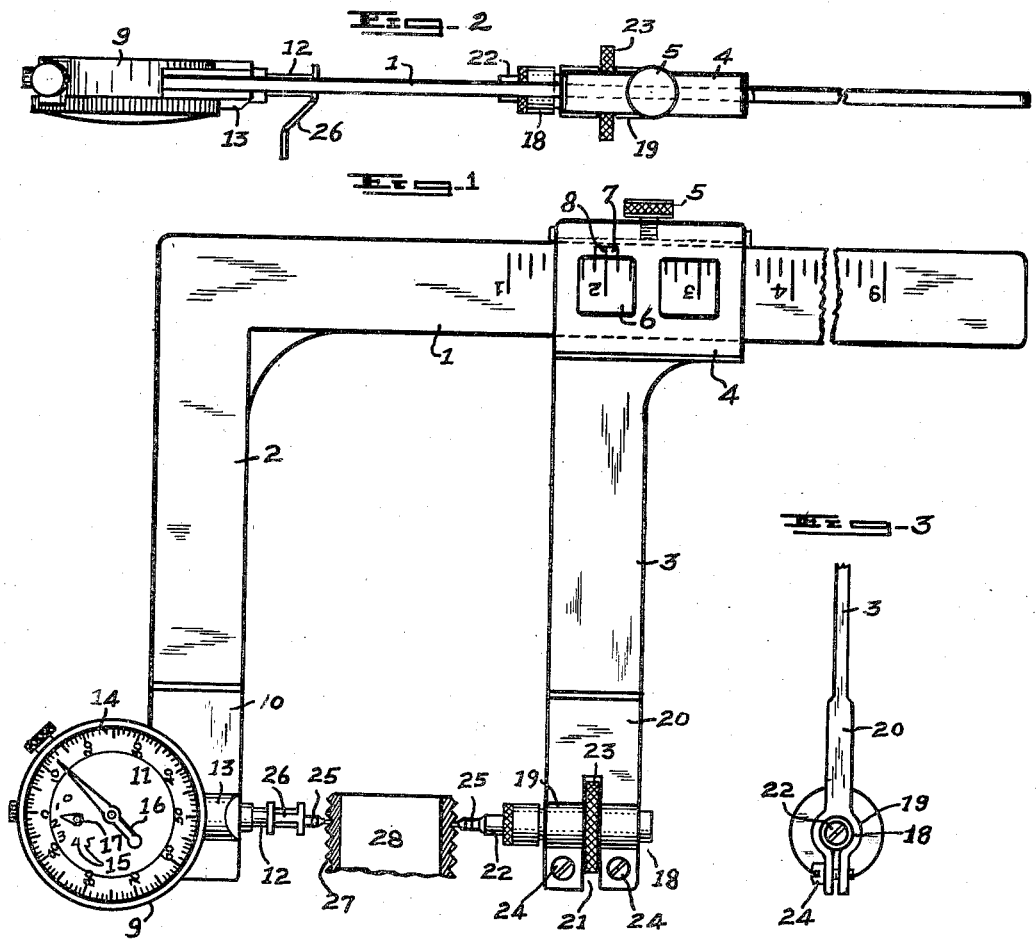

2,210,561

UNITED STATES PATENT OFFICE 2,210,561

OUTER TAPER GAUGE

Charles H. Allen and Rosslyn C. Allen, Pittsburgh, Pa.

Application October 20, 1938, Serial No. 236,060

1 Claim. (Cl. 33—147)

This invention relates to a gauge, and while primarily designed and intended for determining and testing the taper of the diameter of externally threaded pipe ends and the like, it will be obvious that the device may be employed for any other purposes wherein it is found to be applicable.

Important objects and advantages of the invention are to provide an instrument of the character described, which is operable for accurately determining the taper of outside disposed screw threads of pipe ends or other tapered exterior surfaces, which may be readily and conveniently engaged on the work or product to be measured or removed from the latter, which is simple in its construction and arrangement, positive in its action, attractive in appearance, durable and efficient in its use, and comparatively economical in its manufacture and use.

With the foregoing and other objects in view which will appear as the description proceeds, the invention resides in the novel construction, combination and arrangement of parts herein specifically described and illustrated in the accompanying drawing, but it is to be understood that changes in the form, proportions and details of construction may be resorted to that come within the scope of the claims hereunto appended.

In the drawing wherein like numerals of reference designate corresponding parts throughout the several views:

Figure 1 is a top plan view of an outer diameter taper gauge constructed in accordance with the invention.

Figure 2 is an edgewise view thereof.

Figure 3 is a fragmentary rear view of the adapter arm embodied in the present invention.

Referring in detail to the drawing 1 denotes a scale bar provided with a fixed arm 2, which is permanently secured to the outer end of the scale bar and extends at right angles relatively to the latter. The top face of the scale bar is provided with graduated measure markings identified by proper numerical designations representing inches in the usual length rule arrangement.

An adapter arm 3, including a slide 4 permanently fixed therewith, is adjustably mounted on the scale bar, which latter extends longitudinally through the slide. The latter is slidably adjustable on the scale bar and may be locked in the adjusted position on the latter by a headed locking bolt 5 mounted in said slide and operable to engage a side edge of the scale bar. The slide has a top opening 6 having a bevelled wall portion 7 provided with a line marking 8 coacting with the measure markings on the scale bar to facilitate the adjustment of the slide on the latter. The fixed arm 2 and the adapter arm 3 extend parallel to each other, and are preferably of uniform lengths.

A dial indicator 9, of any suitable conventional construction, is fixed in position to the outer side of the enlarged free end portion 10 of the fixed arm 2. The indicator is positioned horizontally flatwise with its adjustable dial 11 being disposed upwardly to facilitate the reading of the latter. The indicator includes a horizontally disposed, spring controlled actuating rod 12, which is longitudinally shiftable in a bearing 13 provided therefor in the end portion 10, and has its inner end disposed toward the adapter arm 3.

The indicator dial 11 is provided with a graduated scale 14, with each of the graduations representing one one-thousandth of an inch, and with a numerical scale 15 having each graduation denoting one-tenth of an inch. A large hand 16 and a small hand 17 are operatively mounted on the dial, said large hand cooperating with the graduated scale 14 and the small hand cooperating with the numerical scale 15.

It will be apparent that the relative movements of the large and small hands 16 and 17 are such that the small hand will indicate the number of complete revolutions made by the large hand during the operation of the instrument.

A horizontally disposed adjusting tube 18 is shiftably supported in a split bearing 19, which is provided therefor in the enlarged free end portion 20 of the adapter arm 3. The end portion 20 is formed with a longitudinally extending open slot 21, which bisects the bearing 19. A contact rod 22 is revolubly mounted in the adjusting tube 18. A knurled adjusting wheel 23, mounted in the slot 21, is threadedly engaged on the tube 18 and operable for longitudinally adjusting the latter with said contact rod 22 in the bearing 19. A pair of set screws 24 is engaged in the end portion 20, and are operable for clamping the bearing 19 to secure the tube 18 in the adjusted position in the latter.

The indicator actuating rod 12 and the contact rod 22 are horizontally aligned on a common axis. The inner end of the indicator actuating rod and the outer end of the contact rod each carry a detachably fixed contact tip 25, which are likewise horizontally aligned in their connections with respective rods 12 and 22, in spaced relation to each other.

The spring controlled actuating rod 12 is normally returned and held in its inward position toward the adapter arm 3, by spring action. An upwardly disposed thumb-hold 26 is fixed to the inner end of the actuating rod to facilitate the shifting of the latter in the outward direction when engaging or removing the device from the work to be measured.

The provision and operation of the adjusting tube 18 with associated parts in the manner stated, permits the adjustment of the instrument with micrometric accuracy to known standards if necessary. Such adjustments could not possibly be effected by the sole adjustment of the slide 4 on the scale bar 1.

As shown in Figure 1, the device is primarily intended for determining the taper of the external screw threads 27 at the end of a pipe 28, or the like, and in practice the operation thereof is as follows: The screw threads 27 are first marked, in any suitable manner, at two points exactly one inch apart, in other words, with one inch of screw threads between said two marked points. The adapter arm 3 is adjusted on the scale bar 1 so that the actuating rod 12 is partially retracted from its normal position, when the contact tips 25 are engaged at diametrically opposed sides of the screw threads at one of said marked points. When the instrument is so engaged, the reading of the dial 11 is taken and noted. The instrument is now positioned in like manner, without adjustment, at the other marking of said two points, and the dial reading is again taken and noted. It will be obvious, that to now calculate the taper it is only necessary to determine the variation of the two dial readings, which were taken and noted when the device was engaged in the two different positions in the manner set forth.

What the proper standard taper per inch of the screw threads should be is, of course, known to the operator, and the primary purpose of the use of the gauge is to determine if the taper is of the standard requirement, and if not, to determine the variations from the latter.

The present invention provides a most efficient instrument of its kind, which may be readily employed by a person of ordinary skill for precisely determining external tapers, even if the latter be so infinitesimal as to be almost incalculable by other devices employed for analogous purposes.

What we claim is:

A taper gauge of the character described comprising the combination of a scale bar provided with measure markings on its top face, a fixed arm carried by said bar and disposed at right angles to the latter, a dial indicator including a shiftable actuating member secured to the free end of said fixed arm, a slide adjustably mounted on said bar and provided with a top opening, one wall of the latter being bevelled and formed with markings coacting with the markings on said bar to facilitate the adjustment of said slide on said bar, a bolt carried by and having screw thread connection with said slide for engaging said bar to secure said slide in the adjusted position on said bar, an adapter arm fixed to said slide and extending parallel to said fixed arm, a bearing formed at the free end of said adapter arm and being provided with an open slot, an externally threaded adjusting element mounted in said bearing, an adjusting wheel mounted in said slot and being threadedly engaged on said element, a pair of aligned contact tips, one of said tips being carried by said actuating member, and the other of said tips being carried by said adjusting element.

CHARLES H. ALLEN.
ROSSLYN C. ALLEN.